Dec. 18, 1934. W. G. KENT 1,985,173
APPARATUS FOR SAMPLING LIQUIDS
Filed May 31, 1932  3 Sheets-Sheet 1

Inventor
Walter G. Kent,
By his Attorneys,
Baldwin & Wight

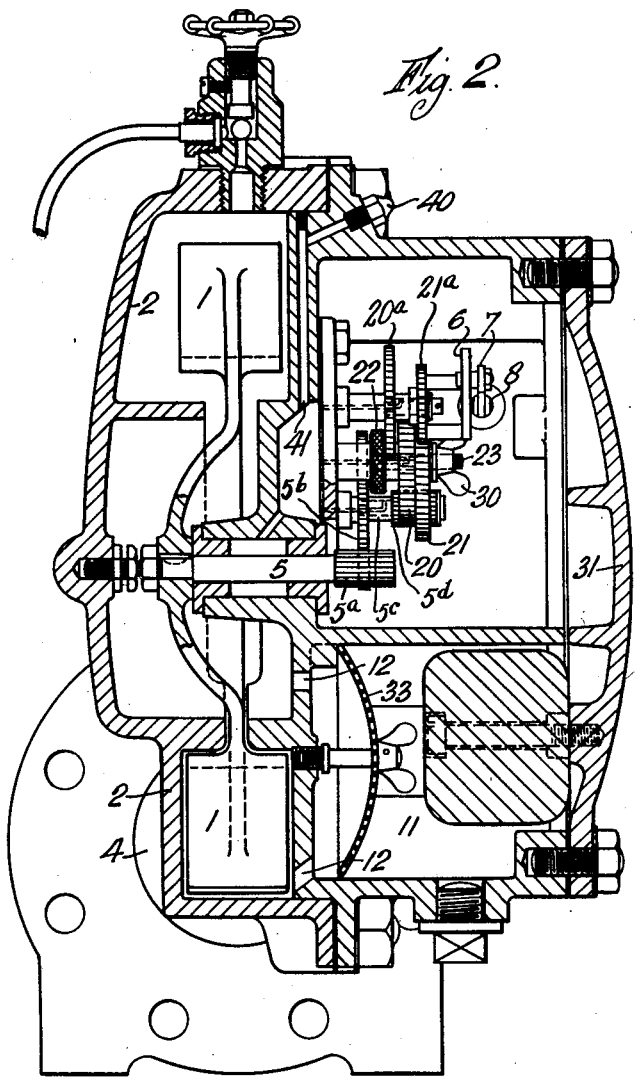

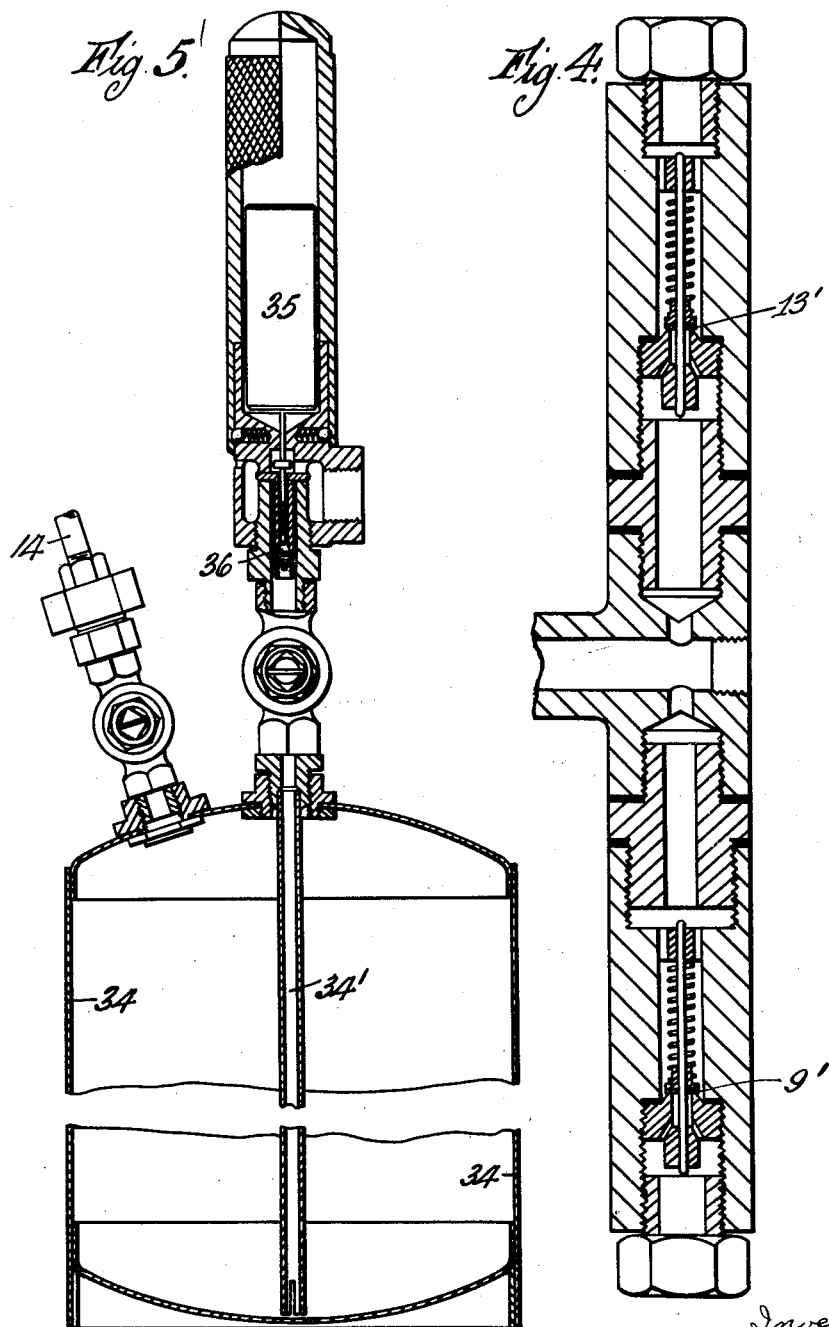

Patented Dec. 18, 1934                                        1,985,173

UNITED STATES PATENT OFFICE 1,985,173

APPARATUS FOR SAMPLING LIQUIDS

Walter George Kent, Luton, England, assignor to George Kent, Limited, London, England Application May 31, 1932, Serial No. 614,595
In Great Britain June 1, 1931

3 Claims. (Cl. 73—21)

This invention relates to improvements in apparatus for sampling fluids, i. e. extracting from a main flow of fluid small quantities of fluid to enable the average quality of the fluid to be determined over a predetermined time period.

The invention is particularly suitable for use in "sampling" oil flowing in an oil main. In such a case it is essential that the samples be kept under pressure during the whole of the operation in order that it shall not give off gas or other volatile constituents which would render the samples incorrect. It is to be understood that the application of the invention is not confined to use in sampling oil but may be applied for use in any case where it is desired to sample a fluid.

According to the present invention there is provided a turbine, Pelton wheel, or other impeller which is rotated at a speed proportional to the rate of flow of the fluid, and a plunger pump or the like which is actuated by the impeller to extract samples of the fluid and to deliver the samples to a receiver which is maintained under pressure, the pressure preferably being greater than that existing in the main.

It will be seen that as the rate of sampling is proportional to the rate of flow of fluid (i. e. the rate of sampling is determined by the quantity factor and not, as has hitherto frequently been the case, by a time factor alone without regard to quantity) the sample obtained will give the exact average quality should the quality vary during the period of sampling.

Figure 1:
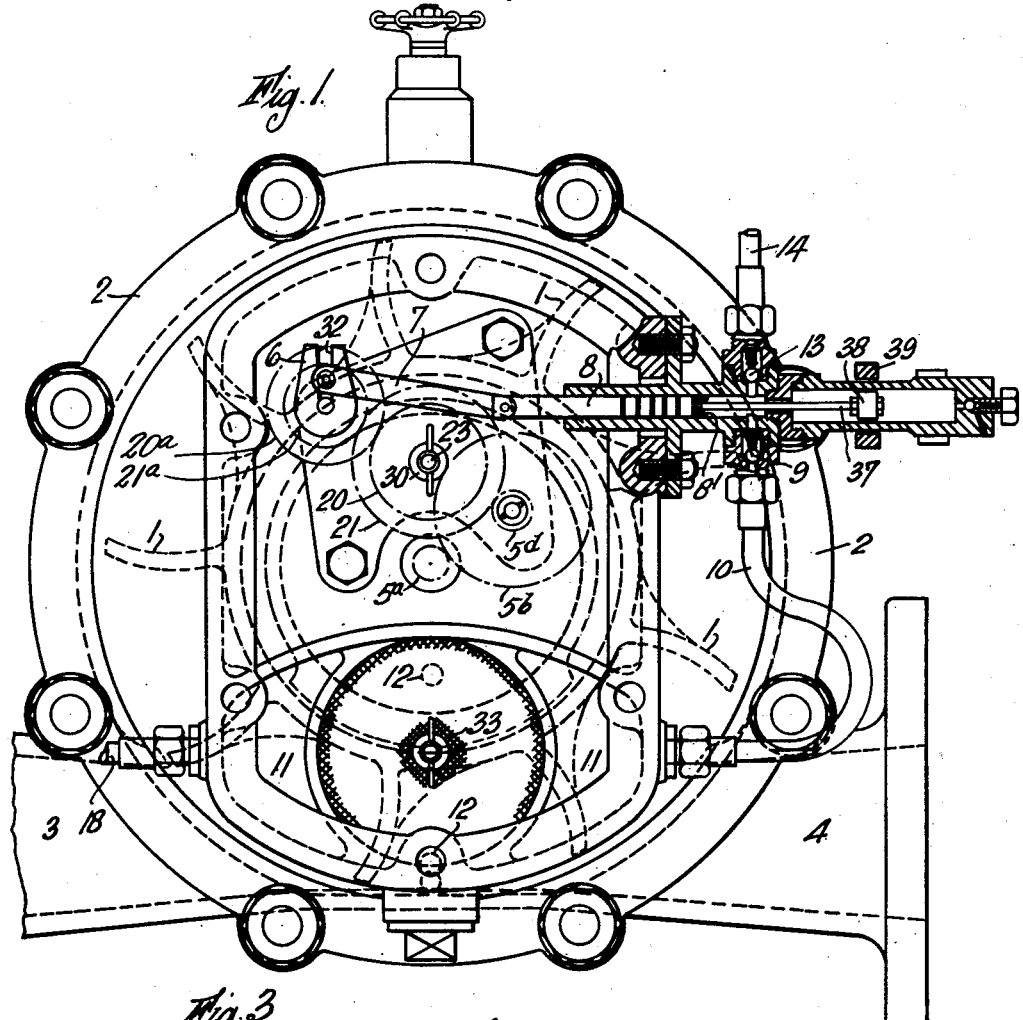
Figure 3:
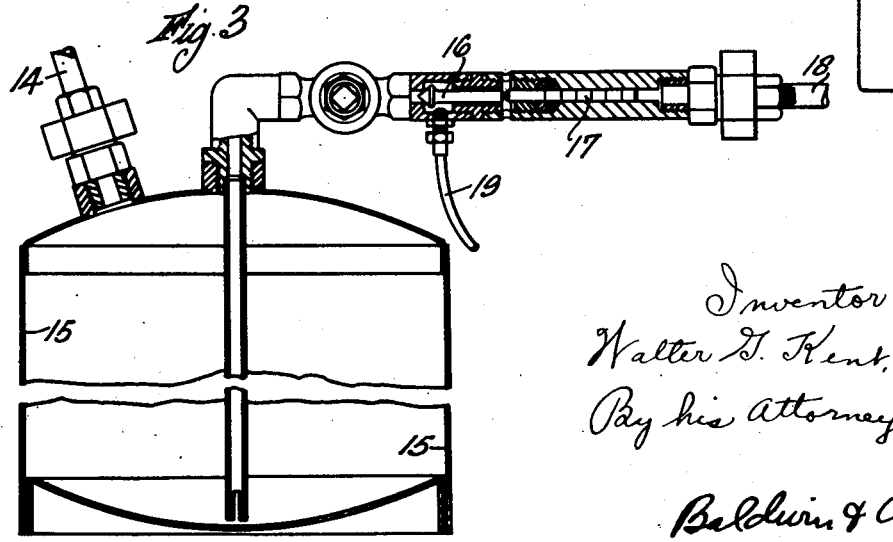

The invention is illustrated in the accompanying drawings in which Figure 1 is a front elevation with a cover plate removed, Figure 2 a vertical section and Figure 3 a vertical section. Figure 4 is a detail view and Figure 5 is a vertical section of a modification.

1 is an impeller mounted in a casing 2 having inlet and outlet branches 3, 4 respectively connected in shunt across an orifice in an oil main. The shaft 5 of the impeller is connected through reduction gearing (hereinafter referred to) to a crank 6 fixed to a shaft $6^a$ and being coupled by a link 7 to a small plunger pump 8 which is continuously actuated by the impeller, the pump being provided with a cup leather 8'. The plunger pump 8 during its suction stroke draws in, past a non-return valve 9 a sample of oil conveyed by a pipe 10 from a chamber 11 which is in communication with the impeller chamber through ports 12. The plunger pump, during its delivery stroke discharges the sample at a pressure greater than that existing in the oil main, the discharge being effected past a second non-return valve 13. The discharged sample is conveyed through a pipe 14 to the top of a receiver 15 filled with water which is gradually displaced by the successive samples. The displacement of the water is controlled by a valve 16 controlled by a piston 17 subjected through a pipe 18 to the pressure existing in the oil main, the valve when open permitting water to be displaced from the receiver and discharged through a pipe 19; the dimensions of the valve 16 and piston 17 are such that the valve 16 is maintained closed to prevent the displacement of water until the pressure in the receiver is greater than that existing in the oil main.

As the speed of the impeller and the plunger are proportional to the rate of flow, the quantity of the sample, during any given period, will be in direct proportion to the total quantity of oil or other fluid passed during that period, and will therefore give an exact average of the quality of the fluid passed. In order to provide a variation in the ratio of the size of sample to the amount of fluid passed along the main, the gearing connecting the impeller shaft 5 to the crank 6 is preferably variable. The drive from the shaft 5 is transmitted to the crank shaft $6^a$ by means of gearing including a pinion $5^a$ fixed on the shaft 5 and meshing constantly with a gear wheel $5^b$ fixed to a sleeve $5^c$. A wide pinion $5^d$ fixed to the sleeve $5^c$ meshes constantly with a gear 21 mounted on a spindle 23. A gear 20 likewise mounted on the spindle 23 is fixed to the gear 21, and the gears 20 and 21 are adapted to mesh with gears $20^a$ and $21^a$ fixed to the crank shaft $6^a$. The gears 20 and 21, which are fixed together, may be positioned on the spindle 23 so as to bring either gear 20 into mesh with the gear $20^a$ so as to provide a relatively low driving ratio, or the gear 21 into mesh with the gear $21^a$ so as to provide a relatively high driving ratio. The gears 20 and 21 are held in either position of adjustment by means of a loose collar 22 which may be positioned inside of the gears 20 and 21, as shown in Figure 2, or outside of said gears, in which latter position the gears 20 and 21 would be located to the left of the position shown in Figure 2, and the gear 20 would be in mesh with the gear $20^a$. A wing nut 30 which can be removed to allow the gear wheels 20, 21 and the collar 22 to be removed is provided to hold the assembly in either of the two positions, access to this being provided by a removable cover plate 31 on the casing.

Further adjustments can be provided by enabling the throw of the crank, and hence the displacement of the plunger pump to be varied, this being conveniently effected by slotting the crank as indicated at 32 and mounting the crank pin so that it can be slid in the slot to the required position. The apparatus can be arranged to give for example, a sample of one gallon per 24 hours at a normal rate of flow along the main when the adjustable crank is set in its mid-position, and one gear ratio is being employed. With the other gear ratio in use, and the other conditions remaining the same, the sample discharged can be arranged to be 2 gallons per day. Further variations of the size of sampling can be effected by altering the throw of the crank.

In place of employing the valves 9 and 13, cork faced valves 9' and 13' of the kind shown in Figure 4 may be employed.

Preferably a strainer 33 is provided to prevent grit and dirt from reaching the plunger pump. Lubrication of the gearing is effected by means of a grease gun applied to a nipple 40 which is connected to a lubricating passage 41.

Preferably the pump plunger 8 is provided with an extension 37 on the end of which is a soft iron armature 38, a casing for this extension being made of gunmetal. Attached to this casing is a pivotally mounted magnet 39 the poles of which magnet are on the exterior side of the casing and on either side of the armature. As the pump plunger moves backwards and forwards, the armature moves with it, and the external magnet oscillates about its pivot, indicating that the sampler is working and is not jammed for any reason. Thus by observing this pivoted magnet an observer could see in a few minutes that the apparatus is in operation without having to wait a considerable period, as would be the case if the rate of sampling is about one gallon for 24 hours.

In a modified construction illustrated in Figure 5 the sample receiver is in the form of a cylinder 34 fitted with a loaded piston 35 which controls the displacement of water from the cylinder 34 through a pipe 34' and past a cork-faced non-return valve 36; the load on the piston 35 is sufficient to exert a pressure greater than that in the main. A similar construction could be adapted, by omitting the pipe 34' and dispensing with the use of water for use in sampling liquids in which water forms a portion of the sample, and the water-oil ratio is desired, the displacement of water by oil being, of course, not practicable in such a case.

It will be seen that samples are maintained under pressure during the whole operation and also when they pass into the receiver so that the samples do not give off gas or other volatile constituent.

Further advantages possessed by apparatus constructed according to the present invention are as follows:—

(a) The power is derived from the pressure in the main and does not require an electric supply or gas or air pressure.

(b) As the apparatus is located in shunt across an orifice in the main it is independent of the size of the main or flow for a given size of sample for a predetermined period. Moreover, the apparatus can be fitted or removed without opening the main or interfering with the main flow, and similarly it can be opened for cleaning and adjustment without interfering with the main flow.

(c) The size of the sample can be adjusted to suit local requirements.

(d) As no fluid runs to waste there is no fire risk as would otherwise occur when sampling oil, for example.

What I claim is:—

1. Apparatus for sampling flowing fluids comprising in combination, a pump having its inlet in communication with the fluid from which samples are to be extracted, pump driving means operatively connected to said pump and being actuated by flow of the fluid for driving the pump, a closed receiver for the pump discharge adapted to maintain the extracted samples under pressure at least equal to that of the fluid from which the samples are extracted, and a conduit connection between the pump and said receiver, the discharge side of said pump, said conduit, and said receiver forming a system normally closed to communication with the atmosphere.

2. Apparatus for sampling flowing fluids comprising in combination, a pump having its inlet in communication with the fluid from which samples are to be extracted, means operatively connected to said pump and being actuated by flow of the fluid for driving the pump, a closed receiver for the pump discharge, a conduit connection between the pump outlet and the receiver and a pressure relief valve connected to said receiver and loaded to prevent escape of fluid from the receiver until the pressure therein has been built up to a value higher than that of the fluid being sampled.

3. Apparatus as set forth in claim 2 in which means are provided for loading said pressure relief valve comprising a pressure responsive piston connected to said pressure relief valve, and means for subjecting said piston constantly to the pressure of the fluid being sampled.

WALTER GEORGE KENT.